United States Patent Office 3,176,994
Patented Apr. 6, 1965

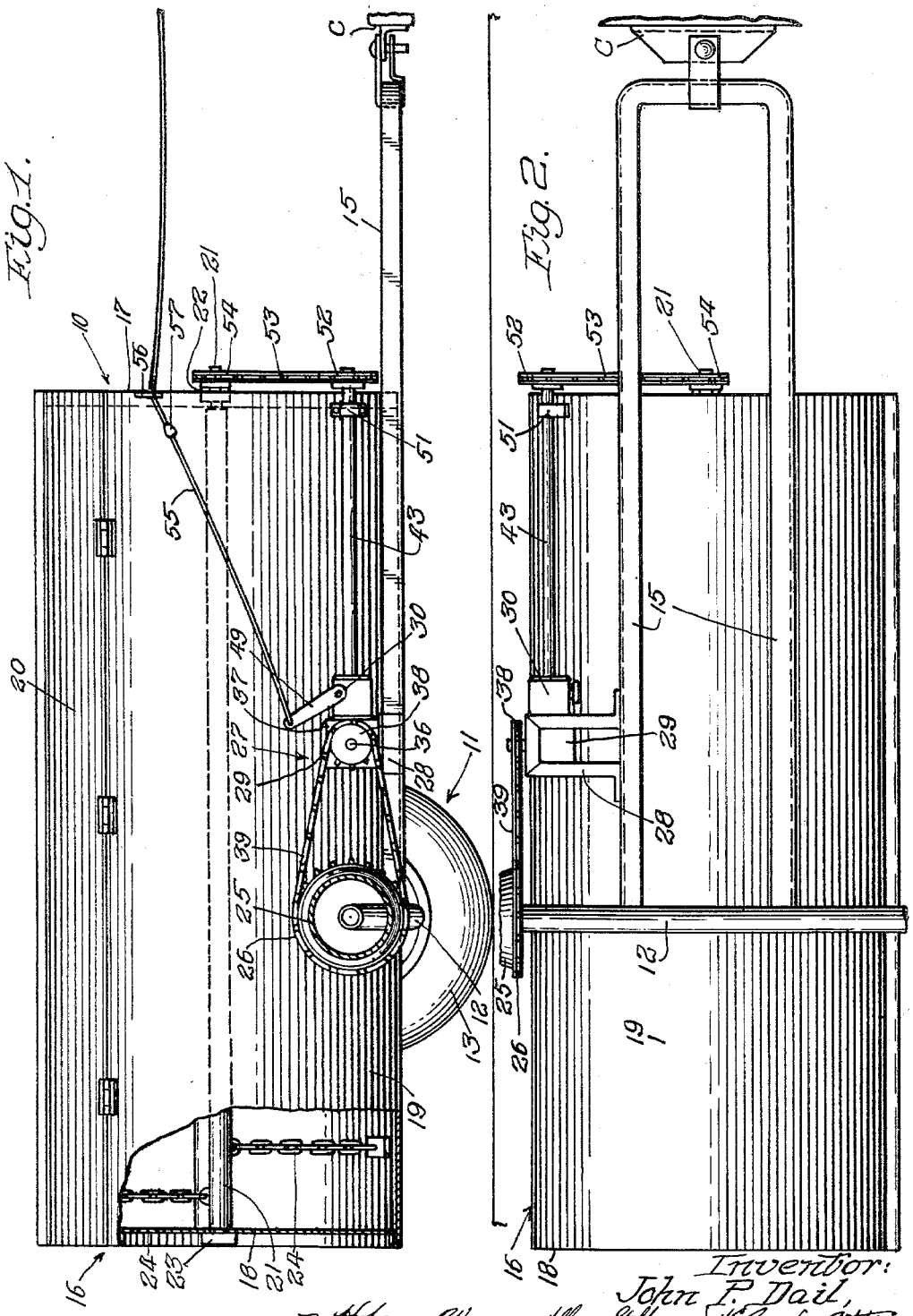

3,176,994
MATERIAL UNLOADER AND SPREADER
John P. Dail, Jr., Harvard, Ill., assignor to Starline, Inc., a corporation of Illinois
Filed Mar. 8, 1963, Ser. No. 263,770
4 Claims. (Cl. 275—3)

This invention relates to a material unloader and spreader, and in particular it relates to a flail type spreader in which the drive for the unloader shaft is derived from rotation of the ground wheels which support the material container.

The principal object of the present invention is to provide a flail type material unloader and spreader which does not require a prime mover supplied with a power take-off.

Another object of the invention is to provide a flail type material unloader and spreader which is of very rugged and simple construction, and the operation of which may be controlled from a prime mover at the rear of which the spreader is positioned in use.

The device of the present invention is particularly adapted to requirements of the small farm operator who has no high powered tractor with a power take-off, and who needs none in his ordinary farming operation. The prime mover for the unloader and spreader here disclosed may be a truck or other towing vehicle.

The invention is illustrated in a preferred embodiment in the drawings, in which:

FIG. 1 is a side elevational view of a material unloader and spreader in accordance with the invention;

FIG. 2 is a fragmentary bottom plan view of the device;

Figure 3:
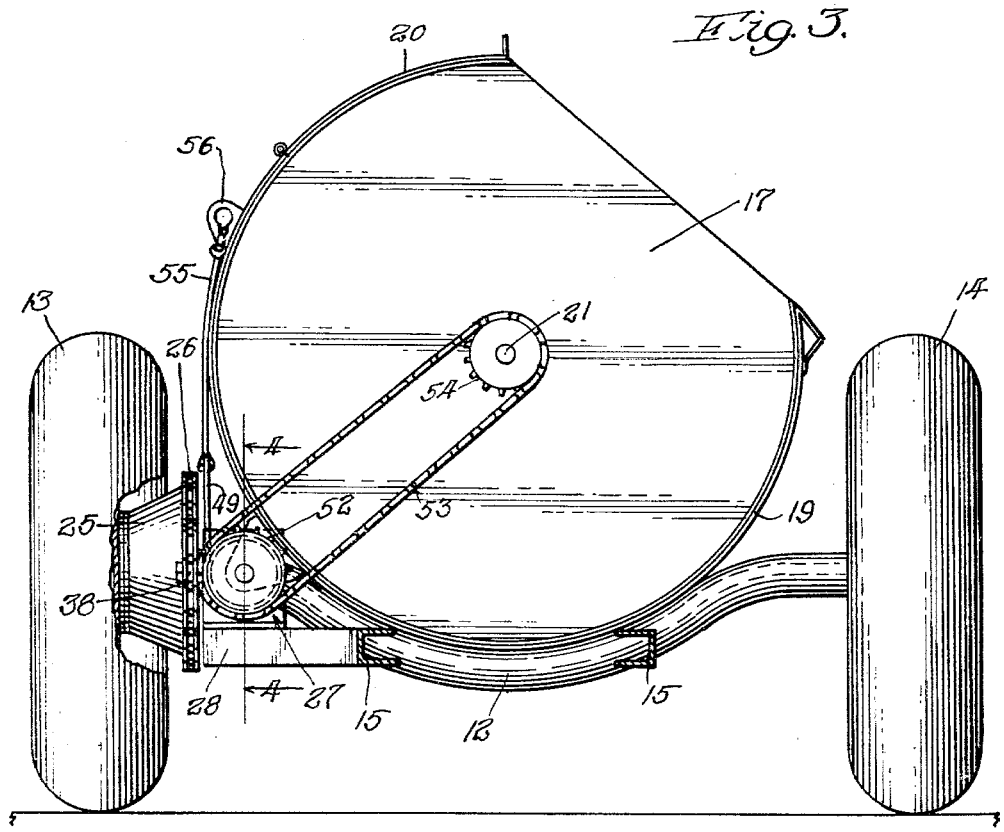
FIG. 3 is a front end elevational view with the hitch tongue cut off.

Referring to the drawings in greater detail, an unloader and spreader, indicated generally at 10, has a wheeled carriage, indicated generally at 11, which includes an axle 12, a driving wheel 13, and an idle wheel 14. A hitch tongue 15 extends forwardly from the wheeled carriage for attachment to a coupler plate C on the rear of a prime mover which may be a truck or other towing vehicle having no power take-off. Mounted upon the wheeled carriage is a material container 16 having end walls 17 and 18, an arcuate bottom wall 19, and a hinged cover 20. An unloader shaft 21 is supported in suitable bearings 22 and 23, and a plurality of flexible flails 24 are mounted on the unloader shaft in spaced relation to one another in accordance with the teachings of Elwick Patent 2,886,332.

The drive for the unloader shaft 21 is afforded by a drive hub 25 on the driving wheel 13 which carries a sprocket 26, and a combined gear and clutch box, indicated generally at 27, is supported forward of the sprocket 26 upon a laterally extending bracket 28 on the hitch tongue 15.

Figure 4:
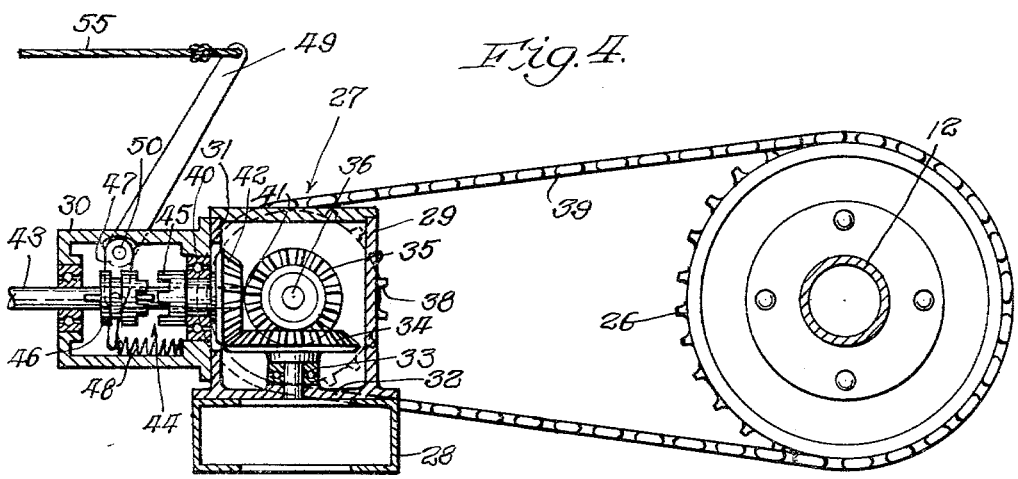
FIG. 4 is a fragmentary section on an enlarged scale taken substantially as illustrated along the line 4—4 of FIG. 3.

As best seen in FIG. 4, the gear and clutch unit 27 includes a gear case 29 supported upon the bracket 28 and a clutch case 30 which extends forwardly from a forward wall 31 of the gear case. A bearing assembly 33 on a bottom wall 32 of the gear case journals a horizontally oriented bevel gear 34 which meshes with a vertically oriented input bevel gear 35 on the inner end of a shaft 36 which is journaled in an outside wall 37 of the gear case and carries an input sprocket 38 outside said wall. A drive chain 39 is trained around the sprocket 26 on the drive hub 25 and around the sprocket 38 of the gear unit so that the bevel gears 34 and 35 are driven in the directions indicated by the respective arrows in FIG. 4.

A bearing assembly 40, mounted in the rear of clutch case 30 journals a shaft 41 carrying a bevel gear 42 which meshes with the horizontally oriented bevel gear 34 so as to rotate the shaft 41 in the direction indicated by the arrow on the bevel gear 42 in FIG. 4.

Drive from the shaft 41 to an output shaft 43 is through a conventional dog clutch assembly, indicated generally at 44, including a clutch input 45 on the shaft 41, a sliding clutch output 46 splined on the shaft 43, a clutch yoke 47 for sliding the clutch member 46 into engagement with the clutch member 45, a compression spring 48 normally moving the sliding member to disengaged position, and an operating arm 49 which is keyed to the yoke by means of a pin 50.

As best seen in FIGS. 1 and 2, the forward end of shaft 43 is supported in a bearing strap 51, and a sprocket 52 on the shaft 43 ahead of the container on wall 17 carries a drive chain 53 which is also trained over a sprocket 54 on a projecting forward end portion of the unloader shaft 21.

Control of clutch engagement and disengagement is by means of a cord 55 which is fastened to the upper end of clutch operating arm 49, extends through an eye 56 on the forward end of container 16, and extends forwardly to the cab of the prime mover where it may be manipulated by the driver. A lug 57 on the cord 55 may engage with the eye 17 to hold the clutch in engaged position, and a twitch on the cord by the driver may release the lug 57 so that the compression spring 48 in the clutch unit disengages the clutch members to stop the drive of the unloader shaft 21.

The foregoing detailed description is given for clearness of understanding only and no unnecessary limitations should be understood therefrom, as modifications will be obvious to those skilled in the art.

I claim:

1. A material spreader comprising: a carriage having coaxial supporting wheels; a container on said carriage having an arcuate wall providing a bottom and sides, and front and rear end walls which are parallel to the wheel axis; a rotatable, longitudinal unloader shaft in the upper part of said container, said shaft extending beyond one of the end walls; a plurality of flexible flails secured to said unloader shaft in spaced relationship to one another; a drive member coaxial with the wheels and secured directly to one of them; a gear box mounted on the carriage between the wheel axis and the plane of said one of the end walls; a driving connection between the drive member and the gear box; a longitudinal output shaft extending from the gear box alongside the lower part of the container and beyond said one of the end walls; a first sprocket on the output shaft; a second sprocket on the unloader shaft coplanar with said first sprocket; a drive chain trained over said sprockets; clutch means at the side of the carriage for selectively breaking the driving connection between the drive member and the output shaft; and means for controlling the clutch means from a position forward of the container and the coaxial wheels.

2. The apparatus of claim 1 in which the clutch means provides a selective driving connection between the gear box and the output shaft, the clutch means includes a clutch actuating arm, and in which a control cable is secured to said arm and extends to a position forward of the container and the coaxial wheels.

3. The apparatus of claim 1 which includes hitch means having structural members that extend rearwardly beneath the container substantially to the wheel axis, in which a gear box bracket is secured to one of said structural members and extends laterally to a position between the curved wall of the container and the longitudinal plane of the wheel to which the drive member is secured, the gear box is mounted on the bracket, and the sprockets are at the front of the container.

4. The apparatus of claim 3 in which the drive member is a sprocket, and the driving connection includes a shaft parallel to the wheel axis, an input sprocket on said shaft coplanar with the drive sprocket, and a chain trained over said drive and input sprockets.

References Cited by the Examiner
UNITED STATES PATENTS

| | | | |
|---|---|---|---|
| 1,263,965 | 4/18 | Twitchel | 172—45 X |
| 2,504,442 | 4/50 | Neighbour et al. | 275—6 |
| 2,769,384 | 11/56 | Selzer | 172—315 X |
| 2,957,698 | 10/60 | Martens | 275—3 |

ABRAHAM G. STONE, *Primary Examiner.*

WILLIAM A. SMITH III, *Examiner.*